G. W. GORE.
MOLDING MACHINE.
APPLICATION FILED SEPT. 13, 1915.
1,202,181.
Patented Oct. 24, 1916.
2 SHEETS—SHEET 1.
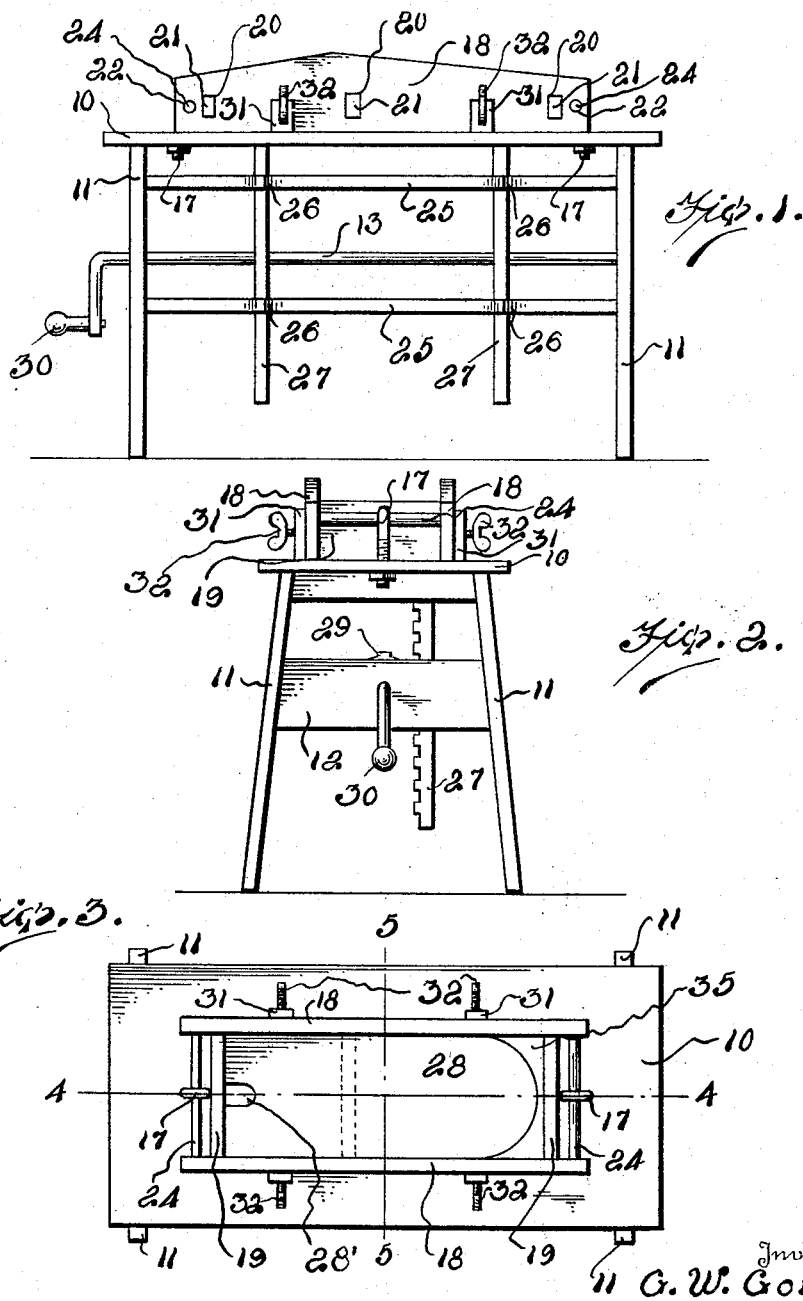
Witnesses
R. K. Stevens
N. M. Test
Inventor
G. W. Gore.
By 
Attorneys

G. W. GORE.
MOLDING MACHINE.
APPLICATION FILED SEPT. 13, 1915.

1,202,181.

Patented Oct. 24, 1916.
2 SHEETS—SHEET 2.

Witnesses
R. K. Stevens
H. M. Test.

Inventor
G. W. Gore.

By
Attorneys

UNITED STATES PATENT OFFICE.

GEORGE W. GORE, OF JOHNSTON CITY, ILLINOIS.

MOLDING-MACHINE.

1,202,181.   Specification of Letters Patent.   Patented Oct. 24, 1916.

Application filed September 13, 1915. Serial No. 50,421.

*To all whom it may concern:*

Be it known that I, GEORGE W. GORE, M. D., a citizen of the United States, residing at Johnston City, in the county of Williamson, State of Illinois, have invented certain new and useful Improvements in Molding-Machines; and I do hereby declare the following to be a full, clear, and exact description of the invention, such as will enable others skilled in the art to which it appertains to make and use the same.

This invention relates to improvements in molding machines, and particularly to machines for molding shingles.

One object of the invention is to provide a novel and efficient device of this character in which shingles of different sizes, shapes and thicknesses can be molded.

Another object is to provide novel means for lifting the pallet so that the same can be quickly and easily removed with the molded shingle.

Figure 4:
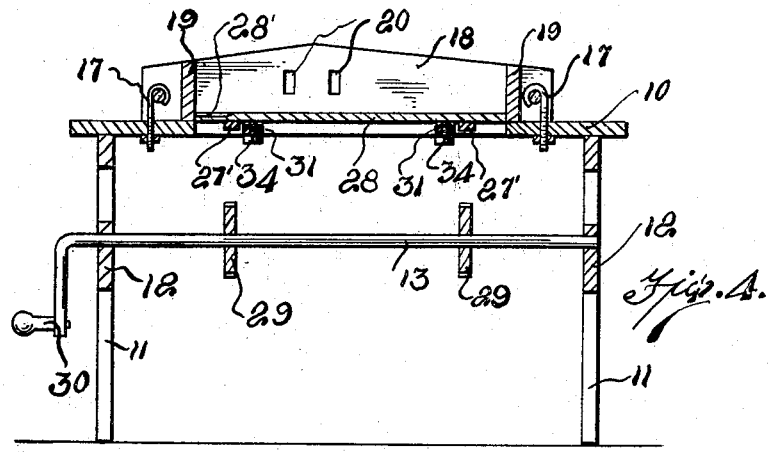
Figure 5:
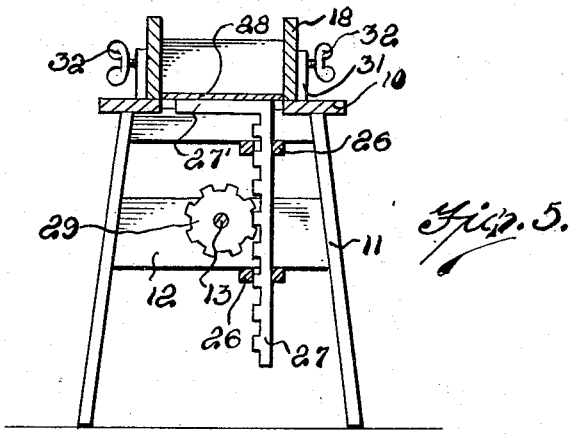
Figure 6:
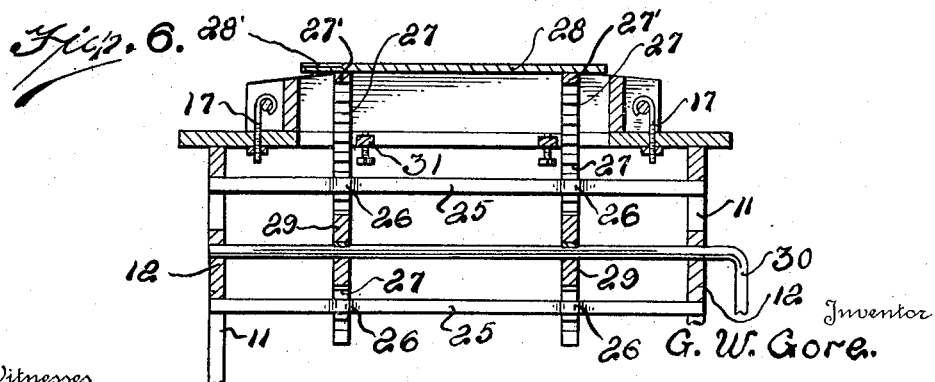

Other objects and advantages will be apparent from the following description when taken in connection with the accompanying drawing, in which:

Figure 1 is a side elevation of my improved shingle molding machine, Fig. 2 is an end view thereof, Fig. 3 is a top plan view, Fig. 4 is a longitudinal section on the line 4—4 of Fig. 3, Fig. 5 is a transverse section on the line 5—5 of Fig. 3, and Fig. 6 is a longitudinal central section showing the pallet raised.

Referring particularly to the accompanying drawing, 10 represents a table top which is supported by the legs 11, at the ends thereof, these legs being connected by the transverse members 12 in which is rotatably supported a longitudinal shaft 13. In the table is formed an opening 14 in the opposite longer side walls of which are formed the notches or recesses 15. Adjacent the ends of the opening 14 there are formed vertical openings 16 through which extend the vertical hook bolts 17. Disposed on the table and surrounding the opening are the parallel side walls 18 and connecting end walls 19 of the mold. These side walls are formed with the openings 20 which receive the tenons 21 of the said end members 19. It will be noted that the ends of the side members extend beyond the end members and in these extensions are formed openings 22 which receive the transverse clamping bolts 24. Engaged with these bolts are the hook bolts 17 which serve to effectively clamp the mold from movement on the table top. Intermediate the ends of the side members are formed openings 20 which are adapted to receive one of the end members when it is desired to make a shingle of a length less than the length of the mold.

Extending longitudinally of the table, and connecting the legs are the bars 25 in which are formed vertical guide eyes 26. Slidable vertically in these guide eyes are rack bars 27, the upper ends of which have the laterally directed portions 27' which support the pallet 28 disposed within the mold, and within the opening of the table top. On the before-mentioned shaft 13 are pinions 29 which engage with these rack bars so that said bars can be raised and lowered upon rotation of the shaft by means of a crank handle 30 carried by one end thereof. A pair of yoke members 31 are engaged under the mold so as to embrace the sides thereof and rest within the before-mentioned recesses 15. The vertical portions of these yoke members are provided with set screws 32 which enter depressions or openings 33 in the side members to hold said yokes in proper position. The transverse portions of the yokes are provided with vertical set screws 34 which engage with the under face of the pallet 28 so that said pallet can be adjusted to any height desired and thus regulate the depth of the mold and the thickness of the shingle. It will be noted that the upper edges of the side members incline longitudinally toward the ends. The shingle would then have a flat bottom with a projection at one end, and a double inclined upper face. This could be varied by providing sides having the upper edges inclining from one end to the other in straight lines or curves, or in fact any outline desired to vary the upper face of the shingle.

By means of the set screws 34 the pallet boards 28 can be raised and supported thereon so that the depth of the mold can be varied with a constant variance in the thickness of the shingles.

After the mold has been filled with the plastic material, and is properly set, the crank handle 30 is turned so as to raise the rack bars and lift the pallet above the top of the mold. It will then be convenient to lift the pallet with the shingle so as to taken the same to a place where the shingle is to be cured. By rotating the crank handle in the opposite direction after placing another pallet board on the top of the rack bars, said bars will be lowered to position the pallet within the mold for receiving a new supply of plastic material.

By placing a block, such as shown at 35 the end of the shingle can be molded with a rounded end. This design may be varied by placing blocks of different shapes in the mold.

The pallet is formed at one end with a semi-circular depression 28', which forms a similarly shaped projection on the finished shingle. Hip and valley shingles can easily be made by placing the proper shaped pallets or blocks on the pallet.

What is claimed is:

In a block molding machine, the combination with a table and a vertically reciprocable pallet therein, of a form mounted on the table and consisting of vertical side and end plates, said end plates being removably and adjustably mounted between the side plates, vertically extending lugs mounted on the table and disposed outwardly of the side plates, and clamping screws carried by said lugs for engagement with the side plates of the form to hold said form in proper position.

In testimony whereof, I affix my signature, in the presence of two witnesses.

GEORGE W. GORE.

Witnesses:
G. F. EBERHARDT,
S. D. HOBBS.

Copies of this patent may be obtained for five cents each, by addressing the "Commissioner of Patents, Washington, D. C."